United States Patent
Wilhelm et al.

(10) Patent No.: US 9,341,132 B2
(45) Date of Patent: May 17, 2016

(54) SYSTEM FOR CONTROLLING AN AFTER-TREATMENT SYSTEM (ATS) TEMPERATURE OF A COMBUSTION ENGINE

(71) Applicant: FPT Motorenforschung AG, Arbon (CH)

(72) Inventors: Pascal Wilhelm, Zurich (CH); Thomas Eckhardt, Romanshorn (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 355 days.

(21) Appl. No.: 13/946,708

(22) Filed: Jul. 19, 2013

(65) Prior Publication Data

US 2014/0188368 A1 Jul. 3, 2014

(30) Foreign Application Priority Data

Jul. 19, 2012 (EP) .................................. 12177047

(51) Int. Cl.
| | | |
|---|---|---|
| *F01N 3/00* | (2006.01) | |
| *F01N 3/20* | (2006.01) | |
| *F02D 41/24* | (2006.01) | |
| *F02D 41/02* | (2006.01) | |
| *F01N 9/00* | (2006.01) | |

(52) U.S. Cl.
CPC .............. *F02D 41/24* (2013.01); *F01N 3/2006* (2013.01); *F01N 9/00* (2013.01); *F01N 9/002* (2013.01); *F02D 41/029* (2013.01); *F02D 41/0255* (2013.01); *F01N 2900/0422* (2013.01); *F01N 2900/08* (2013.01); *F01N 2900/12* (2013.01); *Y02T 10/26* (2013.01); *Y02T 10/47* (2013.01)

(58) Field of Classification Search
CPC .............. F02D 41/0255; F02D 41/029; F02D 41/0235; F02D 41/024; F02D 2200/0414; F02D 2200/0418; F02D 2200/0802; F01N 2900/0422; F01N 2900/08; F01N 2900/12; F01N 3/023; F01N 3/2006; F01N 3/38; F01N 2260/04; F01N 9/00; F01N 9/002
USPC ........... 60/272, 284, 285, 286, 294, 295, 300; 123/179.1, 685
See application file for complete search history.

(56) References Cited

U.S. PATENT DOCUMENTS

| | | | | |
|---|---|---|---|---|
| 7,007,464 | B1 * | 3/2006 | Asami ................... | B60K 6/442 180/65.25 |
| 2004/0237508 | A1 * | 12/2004 | Yamazaki ............. | F01N 3/0835 60/277 |
| 2009/0164085 | A1 * | 6/2009 | Barton .................. | F01N 3/0253 701/102 |
| 2009/0164108 | A1 * | 6/2009 | Baird .................... | F01N 3/0231 701/115 |
| 2010/0107608 | A1 * | 5/2010 | Mitsutani .............. | B60K 6/445 60/285 |

(Continued)

FOREIGN PATENT DOCUMENTS

| | | |
|---|---|---|
| DE | 19957185 | 5/2001 |
| DE | 10351520 | 6/2004 |
| DE | 102004045540 | 3/2006 |
| DE | 102007025419 | 4/2008 |

*Primary Examiner* — Lindsay Low
*Assistant Examiner* — George Jin
(74) *Attorney, Agent, or Firm* — Stetina Brunda Garred & Brucker

(57) ABSTRACT

System for controlling an after-treatment system (ATS) temperature of a combustion engine, comprising means for carrying out an after-treatment warm up procedure, the system providing the interruption/inhibition of such warm-up means after a time period from the warm up procedure starting.

12 Claims, 2 Drawing Sheets

(56) References Cited

U.S. PATENT DOCUMENTS

2010/0126147 A1* 5/2010 Konieczny ............ F01N 3/027
60/286

2010/0185349 A1* 7/2010 Harada .................. B60K 6/365
701/22

2012/0031072 A1* 2/2012 Gonze ..................... F01N 3/101
60/273

* cited by examiner

SYSTEM FOR CONTROLLING AN AFTER-TREATMENT SYSTEM (ATS) TEMPERATURE OF A COMBUSTION ENGINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to field of the methods of operating an engine having an after-treatment system that treats exhaust gas from the engine, including adjusting the operation of the engine to increase the temperature of the exhaust gases, and hence of the after-treatment system (ATS). The after-treatment system may comprise a Selective catalytic reduction (SCR) for the reduction of the NOx emissions and/or a Diesel Particulate Filter (DPF) and/or an oxidation catalyst and/or a clean up catalyst.

2. Description of the Prior Art

Internal combustion engines and diesel engines in particular, often include an after-treatment system for treating exhaust gas from the engine.

In order for the ATS to correctly treat the exhaust gases, it must be heated up to the light-off temperature of the SCR catalyst.

Similarly, the DPF regeneration procedure needs to reach a minimum suitable temperature to be carried out. In general, several measures lead to an increase of the ATS temperature.

Therefore, the engine ECUs are programmed to cause a fuel injection amount variation from a normal amount until the ATS reaches the working temperature.

Other techniques have been developed in order to heat up the ATS temperature.

A common result of any of these techniques is the dismissal of the optimal engine working point.

Of course, this in order to reach a better ATS working point leading to a better working point for the overall system comprising the combustion engine and the ATS.

During these heat-up periods, a high amount of fuel is burnt and additional pollution may be produced for both the high amount of fuel burnt and the low efficiency of the ATS.

Combustion engines could be used also in special and/or extreme conditions. For example, the engine could be left running idle or at low power over a long period, in addition, the environment temperature could be critically low.

In such particular conditions, such suitable temperature could never been reached.

BRIEF SUMMARY

Therefore it is the main object of the present invention to provide a method for controlling the after-treatment system (ATS) temperature of a combustion engine which overcomes the above problems/drawbacks.

The main principle of the invention is to inhibit the ATS warm up when an expected reference temperature of the ATS is unreachable according to the engine working conditions and/or the environment conditions. Therefore, according to the present invention the inhibition of the warm up procedure may be caused by a time out and/or the monitoring of an engine working parameter and/or an environment parameter.

According to a first preferred embodiment of the present invention, at the starting of the warm up procedure a countdown is also started and at the end of the countdown the warm up procedure is interrupted independently of the reaching of the reference temperature of the ATS.

According to a second preferred embodiment of the present invention, the engine working conditions and the environment parameter are simultaneously monitored and if they fall within respective predefined ranges, the countdown is started for interrupting/inhibiting the warm up procedure. The warm-up procedure may be re-enabled if the monitored engine conditions and/or environment parameters fall outside respective predefined ranges. This re-enabling may be delayed with an additional timer and/or bound to additional constraints.

These two embodiments may be combined, for example, by varying the initial count of the countdown as a function of said working conditions and/or environment parameters and/or as a consequence of specific events.

An example of an engine working condition may be the engine revolutions speed. An example of an environment parameter may be the temperature and/or the humidity. An example of an event is an action on a vehicle command by the driver, such as the throttle.

One object of the present invention is a method for controlling the after-treatment system (ATS) temperature of a combustion engine according to claim 1.

Another object of the present invention is an apparatus for controlling the after-treatment system (ATS) temperature of a combustion engine.

A further object of the present invention is a combustion engine provided with an ATS and an apparatus for controlling the ATS temperature.

These and further objects are achieved by means of an apparatus and method as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION

According to a first embodiment of the present invention the activation of the warm-up procedure (step 4, on FIG. 1) causes the countdown start.

If the ATS does not reach the expected reference/optimal temperature, the Warm-up procedure is interrupted at the end of the countdown, otherwise the countdown is reset. Such inhibition could be maintained until a following event happens, for example, an engine stop, an action on the vehicle command, such as the throttle, or a variation of the environment conditions.

Figure 1:
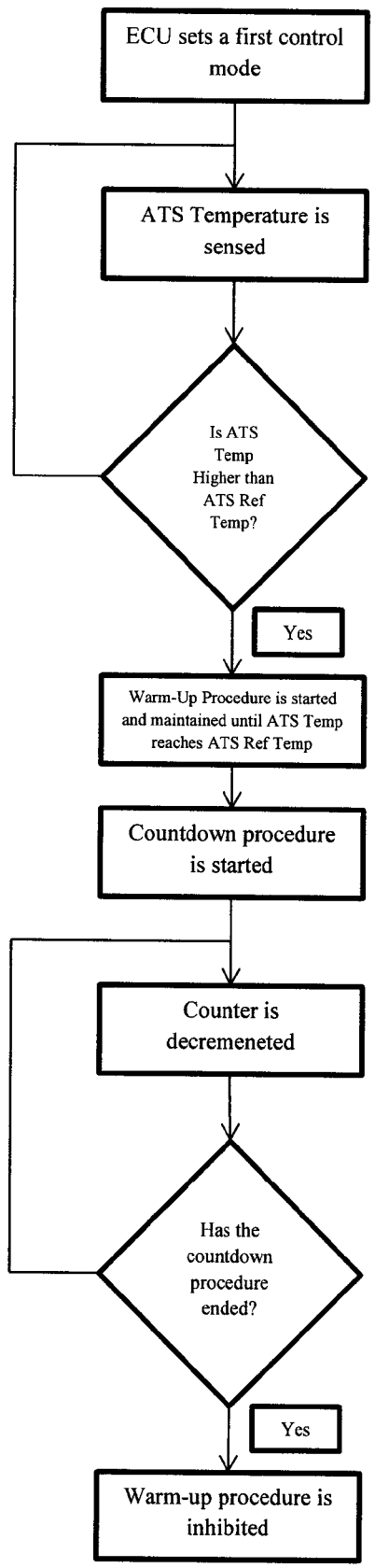
FIG. 1 shows an example of flow chart drawing an example of implementation of the present invention.
Figure 2:
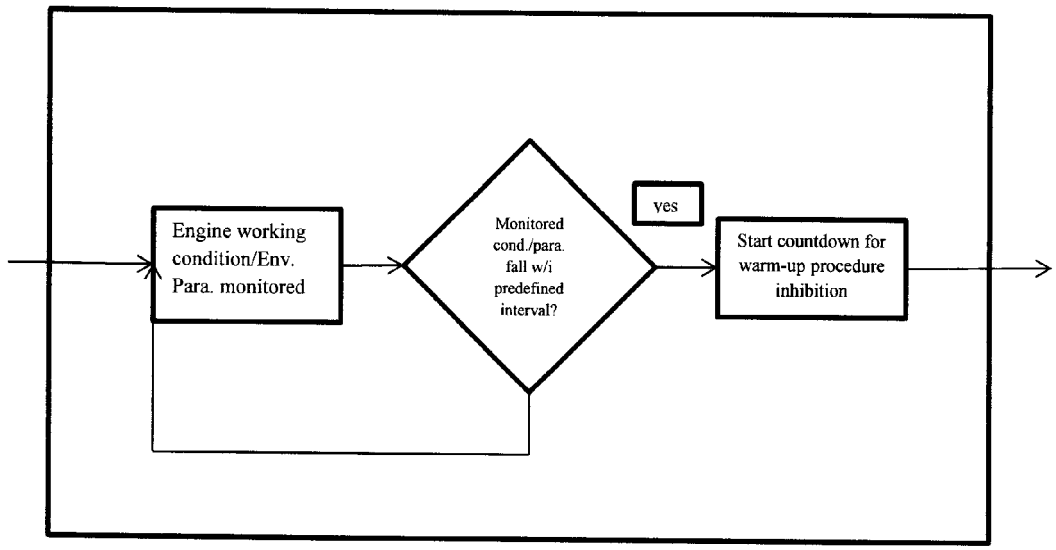
FIG. 2 shows with higher detail one block of the flow chart of FIG. 1.

FIG. 1 shows an example of implementation of the first embodiment of the present invention:

step 1: the ECU set a first control mode that could be the optimal control mode or another control mode, for example at the engine start;

step 2: the ATS temperature is sensed and step 3: such temperature is compared with a reference ATS temperature: if the ATS temperature is higher than the ATS reference temperature (check no) then the temperature sensing continues (step 2) otherwise step 4: warm-up procedure is started and maintained until the ATS temperature reaches the ATS reference temperature, step 5: a countdown procedure is started, then step 6: the counter is decremented step 7: the countdown is checked (check no) until the countdown procedure ends (check yes), then, if the counter is higher than zero, the countdown returns to the step 6 for being decremented, otherwise, step 7: the warm-up procedure is inhibited.

According to a preferred embodiment of the invention, the step 5 comprises further sub-steps:

step 51: an engine working condition and/or environment parameter is/are monitored as instant value and/or as average value, then step 52: such monitoring stands in loop until said engine working condition and/or said environment parameter falls within respective predefined intervals (check yes), then step 53: the countdown for the warm-up procedure inhibition is started.

For example, if the engine revolution speed is under 1500 RPM and/or the requested engine power is under 30% and/or the environment temperature is under 0° C. and/or the humidity is higher than 50%, then the countdown starts for inhibiting the warm-up procedure.

Figure 3:
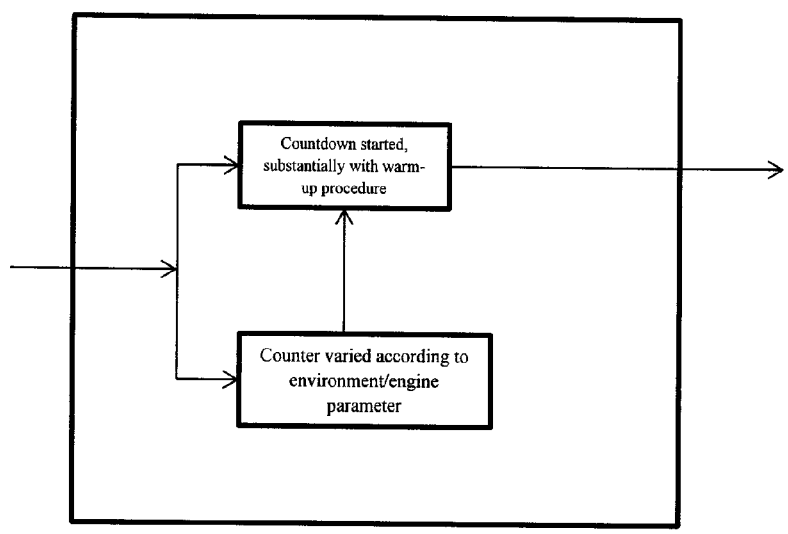
FIG. 3 shows another embodiment of the block of FIG. 2.

According to another embodiment of the present invention, see FIG. 3, step 50: the countdown is started, substantially with the warm up procedure, and step 60: the countdown duration (i.e. the counter) is varied as a function proportional to the environment temperature and/or the environment humidity and/or the engine revolution speed or a requested engine power.

In other words, the time period is varied according to the values of the parameters acquired.

According to the present embodiment, at the step 60 the counter may be reset and restarted when an event happens, such as an operation of the vehicle commands by the driver.

By means of the present invention, a number of advantages are achieved.

These advantages may comprise benefits in fuel consumption and/or decreased emissions of soot or gaseous emissions.

The present method may be carried out through the engine controller (ECU) or through an additional controller in communication with the engine controller.

The above mentioned engine and/or environment parameters are already available on the vehicular CAN network.

This invention can be implemented advantageously in a computer program comprising program code means for performing one or more steps of such method, when such program is run on a computer. For this reason, the patent shall also cover such computer program and the computer-readable medium that comprises a recorded message, such computer-readable medium comprising the program code means for performing one or more steps of such method, when such program is run on a computer.

Many changes, modifications, combinations and variations of the embodiments depicted of the subject invention will become apparent to those skilled in the art after considering the specification and the accompanying drawings which disclose preferred embodiments thereof. All such changes, modifications, variations and other uses and applications which do not depart from the teaching of the invention are deemed to be covered by this invention.

Further implementation details will not be described, as the man skilled in the art is able to carry out the invention starting from the teaching of the above description.

What is claimed is:

1. A method for controlling an after-treatment system (ATS) temperature of a combustion engine comprising a warm up module configured to carry out an after-treatment warm up procedure, the method comprising the steps of:
   interrupting/inhibiting such warm-up module after a time period from the warm up procedure starting;
   acquiring an engine working parameter and/or an environment parameter as instant value or as an average value and then
   a countdown duration for determining said interruption/inhibition after said time period is varied as a function of said engine working parameter and/or an environment parameter.

2. The method according to claim 1, wherein a countdown procedure is started at the starting of the warm-up procedure for determining said interruption/inhibition after said time period.

3. The method according claim 1, further comprising the steps of
   starting a countdown procedure at or after the starting of the warm-up procedure for determining said interruption/inhibition after said time period.

4. The method according to claim 1, wherein the countdown is started before or after said acquisition.

5. The method according to one of the preceding claims 1 or 4, wherein said engine working parameter is an engine speed and/or a requested engine power and/or said environment parameter is a temperature and/or a humidity.

6. The method according to claim 5, wherein said function is proportional with the environment temperature and/or environment humidity and/or the engine revolution speed and/or the requested engine power.

7. The method according to claim 1, wherein said time period is fixed.

8. An apparatus for controlling an after-treatment system (ATS) temperature of a combustion engine comprising a warm up module configured to carry out a after-treatment warm up procedure, the apparatus comprising an interrupter/inhibitor configured to interrupt/inhibit such warm-up module after a time period from an activation of the warm-up module, said interrupter/inhibitor being configured to carry out all of the steps of claim 1.

9. Apparatus according to claim 8, wherein said interrupter/inhibitor is further configured for carrying out all the steps of any of claims 2, 3, 4, and 7.

10. A combustion engine comprising the apparatus according to claim 8.

11. A computer program comprising computer program code adapted to perform all the steps of any of claims 1, 2, 3, 4, and 7 when said program is run on a computer.

12. A computer readable medium having a program recorded thereon, said computer readable medium comprising computer program code means adapted to perform all the steps of any of claims 1 to 2, 3, 4, and 7 when said program is run on a computer.

* * * * *